US008458671B1

(12) United States Patent
Hostetter et al.

(10) Patent No.: US 8,458,671 B1
(45) Date of Patent: Jun. 4, 2013

(54) METHOD AND SYSTEM FOR STACK BACK-TRACING IN COMPUTER PROGRAMS

(75) Inventors: Mathew Hostetter, Jamaica Plain, MA (US); Vineet Soni, Union City, CA (US); Richard Schooler, Cambridge, MA (US)

(73) Assignee: Tilera Corporation, San Jose, CA (US)

( * ) Notice: Subject to any disclaimer, the term of this patent is extended or adjusted under 35 U.S.C. 154(b) by 1130 days.

(21) Appl. No.: 12/378,007

(22) Filed: Feb. 10, 2009

Related U.S. Application Data

(60) Provisional application No. 61/065,441, filed on Feb. 12, 2008.

(51) Int. Cl.
*G06F 9/44* (2006.01)

(52) U.S. Cl.
USPC ................................................ 717/131

(58) Field of Classification Search
None
See application file for complete search history.

(56) References Cited

U.S. PATENT DOCUMENTS

| | | | | |
|---|---|---|---|---|
| 5,202,975 A * | 4/1993 | Rasbold et al. | | 717/151 |
| 5,301,302 A * | 4/1994 | Blackard et al. | | 703/20 |
| 5,774,724 A * | 6/1998 | Heisch | | 717/129 |
| 6,161,219 A * | 12/2000 | Ramkumar et al. | | 717/130 |
| 6,249,910 B1 * | 6/2001 | Ju et al. | | 717/146 |
| 6,415,436 B1 * | 7/2002 | Patel | | 717/140 |
| 6,625,808 B1 * | 9/2003 | Tarditi | | 717/154 |
| 6,704,923 B1 * | 3/2004 | Gosling | | 717/126 |
| 6,993,751 B2 * | 1/2006 | Bhansali et al. | | 717/137 |
| 7,219,335 B1 * | 5/2007 | Moas et al. | | 717/134 |
| 7,246,056 B1 * | 7/2007 | Brewton | | 703/20 |
| 7,412,623 B1 * | 8/2008 | Lindberg | | 714/33 |
| 7,526,750 B2 * | 4/2009 | Andrews et al. | | 717/104 |
| 7,644,210 B1 * | 1/2010 | Banning et al. | | 710/100 |
| 7,725,885 B1 * | 5/2010 | Pradhan et al. | | 717/148 |
| 7,870,541 B1 * | 1/2011 | Deshpande | | 717/131 |
| 7,926,048 B2 * | 4/2011 | Bratanov | | 717/155 |
| 7,984,429 B2 * | 7/2011 | Hunt | | 717/130 |
| 2002/0087949 A1 * | 7/2002 | Golender et al. | | 717/124 |
| 2002/0166115 A1 * | 11/2002 | Sastry | | 717/151 |
| 2003/0126590 A1 * | 7/2003 | Burrows et al. | | 717/154 |
| 2004/0083460 A1 * | 4/2004 | Pierce | | 717/131 |
| 2004/0143721 A1 * | 7/2004 | Pickett et al. | | 711/217 |

(Continued)

FOREIGN PATENT DOCUMENTS

EP            1 870 829 A1 * 12/2007

OTHER PUBLICATIONS

"Hotpath VM: An Effective JIT Compiler for Resource-constrained Devices" by Gal et al. published Jun. 2006.*

*Primary Examiner* — Wei Zhen
*Assistant Examiner* — Adam R Banes

(57) ABSTRACT

The present invention relates to a method, system, and computer program product for performing a computer program analysis. The computer program includes a plurality of instructions. The method performs a static analysis of the computer program to compute the states of a stack pointer (SP), a frame pointer (FP), and a link register (LR) at one or more instructions of the program. The static analysis is preferably performed at compile time. Further, the method computes the states of the SP, the FP, and the LR at the instructions as determined by a dynamic analysis, wherein the dynamic analysis is preferably modeled (performed) during the static analysis. Furthermore, the states determined by the static analysis and the dynamic analysis are compared. If a discrepancy is found between the two states, metadata (information operators) is inserted into the program.

22 Claims, 7 Drawing Sheets

U.S. PATENT DOCUMENTS

| | | | |
|---|---|---|---|
| 2005/0125777 A1* | 6/2005 | Calder et al. | 717/131 |
| 2005/0155018 A1* | 7/2005 | DeWitt et al. | 717/124 |
| 2005/0155022 A1* | 7/2005 | DeWitt et al. | 717/131 |
| 2005/0229018 A1* | 10/2005 | De Oliveira Kastrup Pereira et al. | 713/324 |
| 2006/0015855 A1* | 1/2006 | Kumamoto | 717/136 |
| 2006/0064676 A1* | 3/2006 | Chavan | 717/124 |
| 2007/0006168 A1* | 1/2007 | Dimpsey et al. | 717/130 |
| 2007/0079109 A1* | 4/2007 | Ike | 712/23 |
| 2007/0079294 A1* | 4/2007 | Knight et al. | 717/130 |
| 2007/0288908 A1* | 12/2007 | Cain et al. | 717/130 |
| 2008/0320246 A1* | 12/2008 | Fuhler et al. | 711/154 |
| 2009/0037887 A1* | 2/2009 | Chavan | 717/128 |
| 2009/0083715 A1* | 3/2009 | DeWitt et al. | 717/128 |
| 2009/0113403 A1* | 4/2009 | Davis et al. | 717/146 |
| 2009/0222803 A1* | 9/2009 | Bratanov | 717/155 |
| 2009/0282393 A1* | 11/2009 | Costa et al. | 717/132 |

* cited by examiner

METHOD AND SYSTEM FOR STACK BACK-TRACING IN COMPUTER PROGRAMS

CROSS REFERENCE TO RELATED APPLICATION

This application claims the benefit of U.S. Provisional Application No. 61/065,441 filed Feb. 12, 2008.

BACKGROUND OF THE INVENTION

The present invention relates in general to the dynamic behavior of computer programs. In particular, the invention relates to stack back-tracing in computer programs to check correctness of the programs and to analyze their performance.

A computer program is structured as a set of functions or subroutines in the form of instruction sequences. Typically, during execution of a program, an initial function can call one or more functions, which, in turn, can call other functions. To understand the dynamic behavior of the program, it is necessary for a programmer to understand how a program reaches a particular program location via the set of function calls executed to reach that particular program location. This knowledge helps the programmer to identify the root cause of faults (if there are any) or to determine the full context of performance analysis statistics collected at various points during the execution of the program.

The process of determining a function call chain, step by step, is generally referred to as stack back-tracing. Typically, conventional methods for stack back-tracing require additional memory space, and they can adversely affect the performance of the program. In some cases, conventional stack back-tracing may require external metadata such as debug information produced by a compiler. It is acceptable for metadata to be present in pre-production program code. However, the metadata should not be present in production code as it becomes difficult to perform proper stack back-tracing. Other methods provide internal metadata, such as embedded back-trace tables, to enable stack back-tracing. However, this increases the size of the program-executable files and may adversely impact the performance of the program due to increased cache and memory effects. In addition, conventional methods of stack back-tracing may not be completely compatible with highly optimized code, operating system kernel code, or with programming language features such as alloca (dynamic stack allocation). In such cases, stack back-tracing may provide incorrect results or may fail to back-trace from certain points of the program.

In light of the foregoing, there is a need for a method and system for stack back-tracing which increases the efficiency of back-tracing by reducing memory usage. The method preferably should not affect the performance of the program. Further, the method preferably should be compatible with highly optimized codes, operating system kernel codes or programming language features such as alloca. Furthermore, the method preferably should work in pre-production as well as production codes.

SUMMARY

An object of the present invention is to provide a method, system, and computer program product for performing a computer program analysis.

In accordance with one embodiment of the invention, a method for performing computer program analysis is provided to facilitate stack back-tracing in the program. The method includes performing a static analysis of the computer program, using a variant of the single static assignment (SSA) technique. The static analysis of the computer program is performed at compile time. Further, the method includes performing a dynamic analysis of the computer program. The dynamic analysis is modeled during the static analysis of the program. Thereafter, one or more results of the static analysis and the dynamic analysis are compared and metadata is inserted into the computer program if a discrepancy is found in the results. The metadata can be, for example, information operators.

In another embodiment, a system for performing a computer program analysis is provided. The system includes a static analysis module for performing a static analysis of the computer program. Further, the system includes a dynamic analysis module for performing a dynamic analysis of the computer program. The dynamic analysis is modeled during the static analysis of the program. Furthermore, the system includes a comparing module for comparing one or more results of the static analysis and the dynamic analysis. If a discrepancy is found in the results, an inserting module inserts metadata into the computer program.

In yet another embodiment, a computer program product for use with a computer is provided. The computer program product includes instructions stored in a computer usable medium having a computer readable program code embodied for performing a computer program analysis. The computer program code includes program instructions for performing a static analysis of the computer program. Further, the computer program code includes program instructions for performing a dynamic analysis of the computer program. The dynamic analysis is modeled during the static analysis of the program. Furthermore, the computer program code includes program instructions for comparing one or more results of the static analysis and the dynamic analysis of the computer program. The computer program code also includes program instructions for inserting metadata into the computer program if a discrepancy is found in the results of the static analysis and the dynamic analysis.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DETAILED DESCRIPTION OF THE INVENTION

Figure 1:
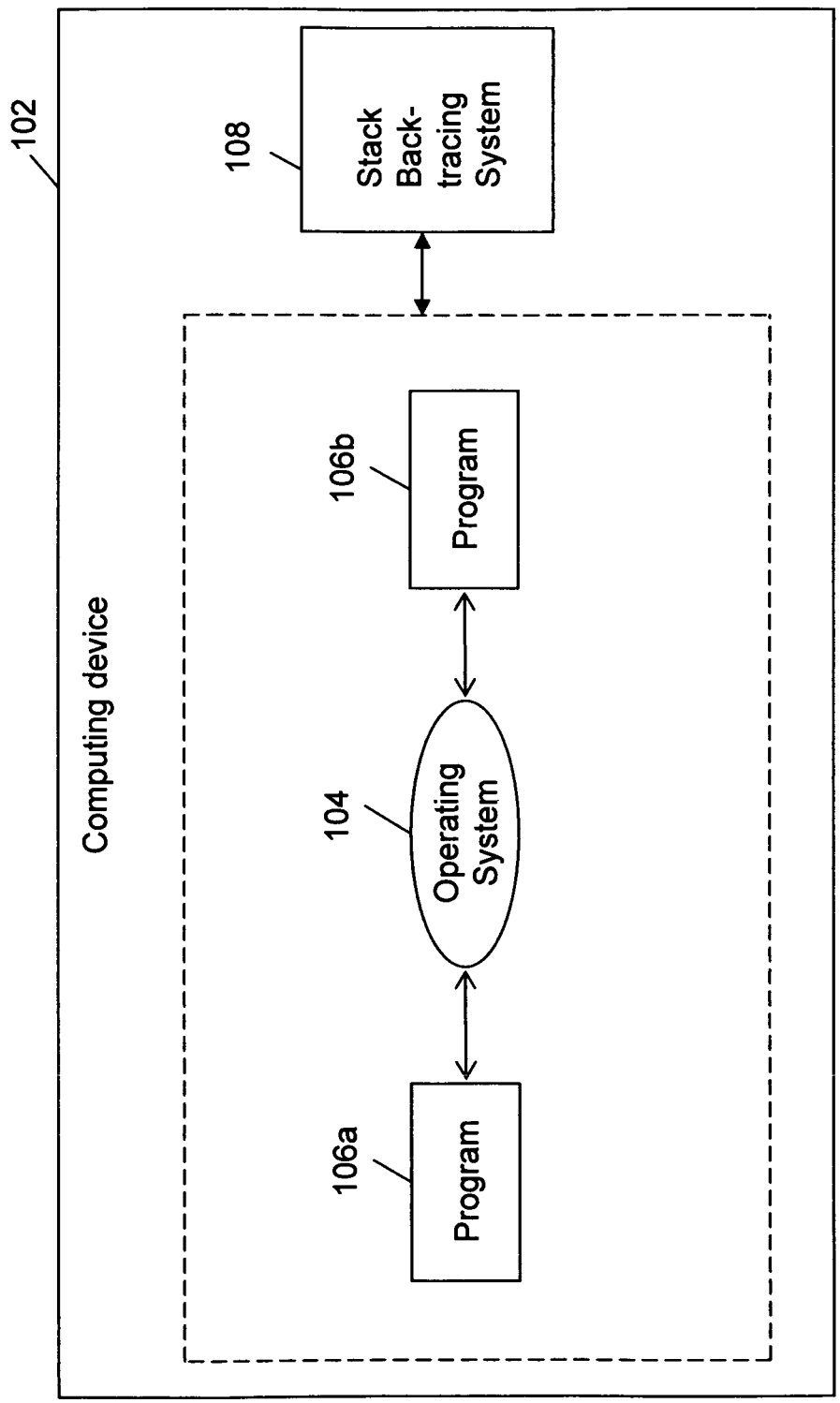
FIG. 1 illustrates an exemplary environment in which various embodiments of the present invention can be practiced.

While the embodiments of the invention have been described, the invention is not limited to these embodiments only. A number of changes and modifications can be considered without moving away from the scope of the invention, as set forth in the claims.

Various embodiments of the present invention provide a method and system for performing a computer program analysis to facilitate stack back-tracing in the computer program. The computer program includes a plurality of functions or subroutines. The functions or subroutines are structured as instruction sequences. The computer program includes a plurality of instructions having functional relationships with each other. The computer program is hereinafter referred to as a program.

To better understand the functional relationship, consider two functions A and B in which, during the execution of function A, function A calls function B. Typically, when function A calls function B, function A can save various values associated with function A, and these values are placed on a stack in the computer's memory. The stack is a last in, first out (LIFO) data structure, which is used for storing values in the computer's memory. Therefore, the value that is added last in the stack is retrieved first from the stack. For a given function call, the collection of the values that are placed on the stack is called a stack frame. The address of the bottom of the current stack frame is called a stack pointer (SP), and the address of the top of the current stack frame is called a frame pointer (FP). The Link Register (LR) is the address of the most recently executed subroutine call instruction. Therefore, it can be said that the states of the SP, the FP, and the LR of function A are saved on the stack. The saved states are retrieved from the stack when function B ends and the control returns to function A.

To compute one or more potential states of the SP, the FP, and the LR, the present invention performs a static analysis of the program. The states computed during the static analysis are the 'potential states' as the actual states are computed during runtime. The static analysis of the program is performed by using a variant of the single static assignment (SSA) technique to compute the potential states of the SP, the FP, and the LR at one or more instructions of the program. The static analysis of each instruction of the program is performed at compile time. The method for performing static analysis begins by first identifying all the instructions of the program that manipulate the SP, the FP, and the LR of the program, and then marking these identified instructions as 'events of interest' for further analysis. Furthermore, the method includes computing a dominator tree for a control flow graph of the program.

Those ordinarily skilled in the art will know that the control flow graph is a graphical representation of the program, composed of nodes and edges, depicting all paths that might be traversed during the execution of the program. Each node of the control flow graph represents a sequence of instructions that does not contain branches, except possibly as the last instruction in the sequence. The transfer of control from one node to another node, or the transfer of control to the same node, can be represented as an edge in the control flow graph. The dominator tree describes a dominance relationship between the nodes of the control flow graph. Given nodes X and Y in the control flow graph, node X dominates node Y only if every path from entry to node Y (not including node Y) passes through node X.

Once the dominator tree is computed, iterative dominance frontiers of the control flow graph are computed. The dominance frontier of a node Z is a set of all nodes S, such that Z dominates a predecessor of S, but Z does not strictly dominate S. Thereafter, based on the identified events of interest and the iterative dominance frontiers, the method includes computing nodes that require insertion of a phi function ($\phi$) of the SP, the FP, and the LR. The phi function represents the confluence of the events at the start of the node that has multiple predecessors, in the same way as the phi represents the confluence of values in a standard SSA program representation.

Based on the identified events of interest and data flow analysis, the method includes computing the potential state of the SP, the FP, and the LR for all the computed nodes. For an embodiment of the present invention, the state of the SP, the FP, and the LR are computed at the compile time of the program code. Further, the method includes computing the state of the stack frame at each instruction, as determined by the dynamic analysis. The dynamic analysis is preferably modeled (performed) during the static analysis. A back-trace library computes the state of the SP, the FP, and the LR corresponding to each instruction of the program during the dynamic analysis. The back-trace library is a collection of code to compute the program back-trace based on the contents of memory and registers. Subsequently, the state of the SP, the FP, and the LR is updated on the static analysis of each instruction of the computer program by using the computed state for each node. This updated state is then compared with the state of the SP, the FP, and the LR, as determined during the dynamic analysis. If a discrepancy is found between these two states, metadata is inserted at a point in the instruction stream that does not lengthen the instruction stream of the program. An information operator is a type of metadata. The information operators are unusual no-operation (no-op) instructions recognized by the dynamic analysis. The operand(s) to these no-op instructions convey information which is useful for the dynamic analysis. However, the information operators have no effect on the behavior of the program. Those ordinary skilled in the art will know that there can be other types of metadata besides the information operator. If the information operator cannot be scheduled without lengthening the instruction stream of the program, it is inserted at the last possible point. The information operator is typically inserted before any instruction that may cause a state change, which, in turn, may render the information operator invalid.

The present method of program analysis is a stack back-trace analysis of the program, since the information operators ensure that the state of the stack frame is readily computable at every instruction. The present method enhances a simple runtime (dynamic) analysis with an exhaustive static (e.g., compiler) analysis to insert information operators in the program. The present method is simple to compute at runtime; however, it is very robust since it is backed by a thorough static examination of the program.

The algorithm used in the present invention is built on a conventional Application Binary Interface (ABI) specification that specifies a stack layout, register usage, etc., which enables a straight-forward dynamic analysis for performing a stack back-trace. The present algorithm for back-tracing includes a preparatory static analysis and information operator insertion in the program. The algorithm is performed during the compile phase after the generation and optimization of the compiler code, and is followed by the dynamic analysis.

FIG. 1 illustrates an environment in which various embodiments of the present invention can be practiced. Environment 100 includes a computing device 102. Computing device 102 includes an operating system 104 for managing hardware and software resources of computing device 102. Examples of computing device 102 include, but are not limited to, personal computers, mobile phones, and handheld devices. The functions of operating system 104 include, but are not limited to, controlling and allocating memory, prioritizing system requests, and controlling input and output devices of computing device 102. Examples of operating system 104 include, but are not limited to, Windows®, Linux®, and Mac OS®. Two programs 106a and 106b, hereinafter collectively referred to as programs 106, are being executed on operating system 104. A program is a passive collection of instructions. A person ordinarily skilled in the art will understand that the number of programs 106 is not limited to two, but has been assumed as two for the exemplary purpose of explaining the invention.

Computing device 102 further includes a stack back-tracing system 108. Stack back-tracing system 108 includes various modules for performing the analysis of programs 106 to facilitate stack back-tracing in programs 106 in accordance with various embodiments of the invention. The various modules of stack back-tracing system 108 provide a method and system for computing the state of the stack frame on the execution of the instructions of the function of programs 106. Stack back-tracing system 108 has been described in detail in the description of subsequent figures.

Figure 2A:
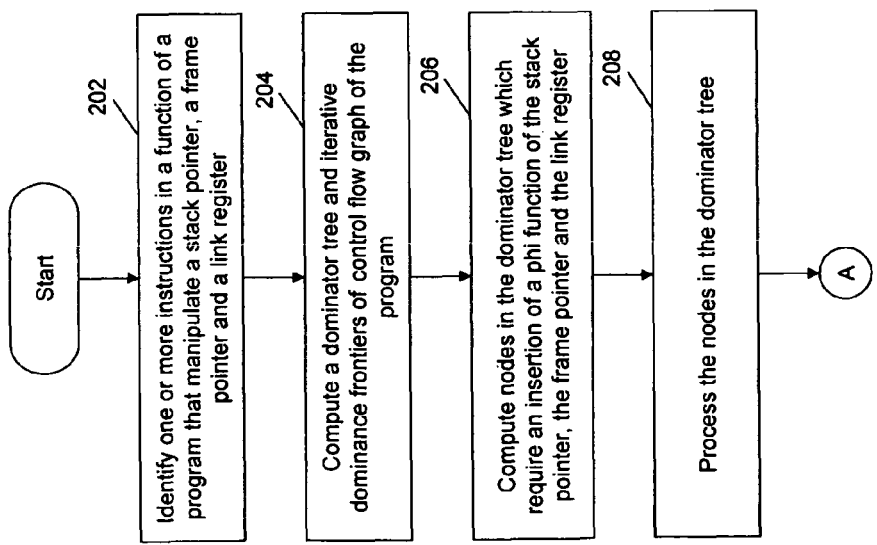
FIGS. 2A and 2B are flow diagrams illustrating a method for computing a state of a stack frame on execution of each instruction of a function of a program, in accordance with an embodiment of the invention.
Figure 2B:
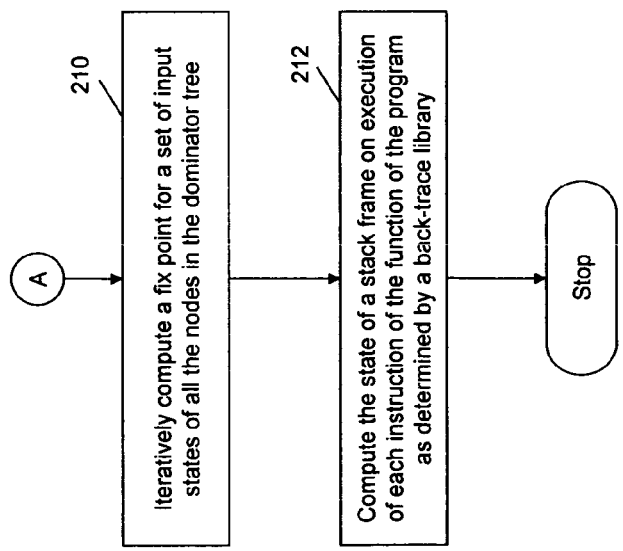

FIGS. 2A and 2B are flow diagrams illustrating a method for computing the state of the stack frame on the execution of the instructions of the program. The method involves performing the static analysis of the program using a variant of the SSA technique to compute one or more potential states of the SP, the FP, and the LR at the one or more instructions of the program. The static analysis of the instructions of the program is preferably performed at compile time.

At step 202, the static analysis of the program is performed for the instructions of the program that manipulate the SP, the FP, and the LR to be identified and marked as events of interest.

At step 204, the dominator tree and iterative dominance frontiers of the control flow graph of the program are computed. Those ordinarily skilled in the art will know that a dominator tree describes a dominance relationship between the nodes of the control flow graph. For example, a particular node 'X' dominates node 'Y' if every control flow path from a distinguished starting node to the node Y needs to pass through node X in the control flow graph. The dominator tree for the control flow graph can be computed using standard algorithms. Referring to the example above, the dominance frontier of node X is a set of nodes 'T', such that X dominates some, but not all, of the predecessors of T.

At step 206, the nodes in the control flow graph are computed where insertion of a phi function (φ) of the SP, the FP, or the LR is required. The nodes are computed on the basis of the events identified at step 202 and the iterative dominance frontiers computed at step 204. The phi function represents the confluence of events at the start of a node with multiple predecessors. The phi function mentioned above is similar to the phi function used in the SSA program representation. The only difference is that the phi function of SSA represents the confluence of values, whereas that of the present invention represents the confluence of the events of interest. Those ordinarily skilled in the art will appreciate that in the present invention, the phi function can also be added to organize the flow of data or events in the control flow graph in the same manner as in the SSA.

At step 208, the nodes in the dominator tree are processed to symbolically interpret the sequence of events that manipulates the state of the SP, the FP, and the LR in the program. The state mentioned above can be, for example, determining if the stack frame has been allocated at a particular instruction, if the FP has been established at the instruction, or if the LR has been saved on the stack. In accordance with an embodiment of the present invention, step 208 also includes the step of updating the states of the phi functions of the nodes in the control flow graph.

At step 210, a fix point for a set of input states of the nodes in the control flow graph is iteratively computed. Further, the potential states of the SP, the FP, and the LR are computed at the instructions of the program on the basis of an iterative fix point analysis. Furthermore, changes taking place in the potential states of the SP, the FP, and the LR are tracked at the instructions of the program. The iterative fix point analysis is desirable as the control flow graph may contain cycles. In accordance with an embodiment of the present invention, the fix point for the set of input states of a node is the state of the stack frame upon its entry into that node. The input state is composed of the states of the three variables of interest, i.e., the SP, the FP, and the LR. The set of possible states for each of these variables depends on the ABI and is a matter of choice of the implementation. For the implementation of the ABI, the set of possible states of the SP includes stack frame unknown, not allocated, allocated, de-allocated, and inconsistent. The set of possible states of the FP includes frame pointer unknown, not created, created, destroyed, and inconsistent. The set of possible states of the LR includes return address unknown, live in LR, live in LR and saved on stack, saved on stack but not live in LR, saved on stack and restored in LR, not saved on stack and not live in LR, and inconsistent. The inconsistent state may arise if the input states cannot be combined to a definite state at the phi function. However, the inconsistent state does not arise in well-formed programs.

At step 212, the state of the stack frame is computed on the execution of the instruction of the program, as determined by the dynamic analysis. As explained earlier, the dynamic analysis is modeled during the static analysis. The back-trace library determines the state of the SP, the FP, and the LR corresponding to each instruction of the program during the dynamic analysis.

Figure 3:
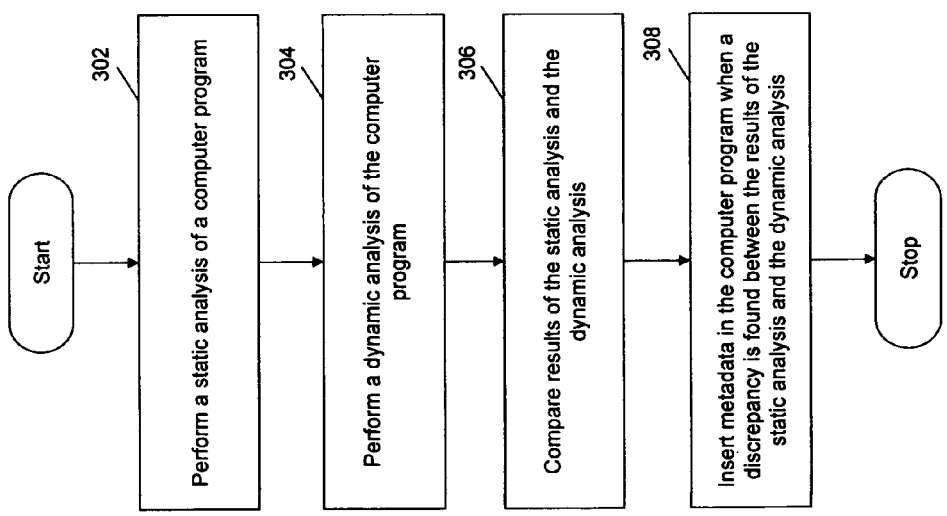
FIG. 3 is a flow diagram illustrating a method for performing a computer program analysis, in accordance with an embodiment of the invention.

After the state of the stack frame corresponding to the back-trace library is known, it is compared with the state determined at step 302, as described in conjunction with FIG. 3.

For an embodiment of the present invention, the method includes computing the state of the stack frame upon execution of the instructions of the program. The subsequent method for inserting metadata in the program is explained in regard to FIG. 3.

FIG. 3 is a flow diagram illustrating a method for performing a computer program analysis in accordance with various embodiments of the invention. The analysis of the program is a stack back-trace analysis of the program. As mentioned in FIGS. 2A and 2B, the program includes a plurality of instructions or functions. To execute the program, an initial function calls other functions, which, in turn, can call other functions.

As explained at step 210 of FIG. 2B, the fix point for the set of input states of the nodes in the function is computed. In accordance with an embodiment of the present invention, the fix point is computed, based on the known input states of the nodes. For example, the fix point can be computed based on the state of the SP, the FP, and the LR of the nodes. At step 302, the static analysis of the program is performed. The static analysis of the program is preferably performed at compile time.

The state computed during the static analysis is referred to as a first state in the description below. In the static analysis, the first state of the SP, the FP, and the LR of the instruction is updated based on the known input states of all the nodes of the function. For example, if the states of the SP, the FP, and the LR are known for a particular node, the state of the instructions corresponding to that node is updated by using the known states. The first state of the SP, the FP, and the LR is updated on the static analysis of the instructions of the program. Further, a location in the program is scanned forward until an occurrence of the terminating instruction in the program. The location in the program corresponds to at least one node of the control flow graph. Scanning proceeds until the FP and return address are known. It stops when it encounters the terminating instruction. Examples of a terminating instruction include, but are not limited to, a real instruction and an information operator. Further, changes taking place in the state of the SP, the FP, and the LR are also tracked based on the scanning.

At step 304, the dynamic analysis of the program is performed. The dynamic analysis is modeled during the static analysis. In other words, the dynamic analysis is simulated during the static analysis. The state computed during the dynamic analysis is referred to as the second state in the description below. As already mentioned in conjunction with FIGS. 2A and 2B, the back-trace library determines the second state of the SP, the FP, and the LR corresponding to the instructions of the program during the dynamic analysis.

In some cases, while executing a function, the operating system can raise an interrupt, which causes a special interrupt frame to be saved on the stack. In this case, the control passes to an interrupt handler, which can call other functions. In these cases, the dynamic analysis back traces out of unusual transfers of control, such as interrupts and system calls, by recovering the address of the instruction of the function encountering the interrupt. Thereafter, the dynamic analysis is restarted from the point of the interrupt based on the recovered address. Furthermore, the static analysis uses a dataflow algorithm for handling these unusual transfers of control such as interrupts and system calls.

At step 306, results from the static analysis and the dynamic analysis are compared, i.e., the updated first state of the instruction is compared with the second state of the SP, the FP, and the LR, as determined by the back-trace library.

At step 308, metadata is inserted into the program if a discrepancy is found between the results of the static and the dynamic analysis, i.e., if the discrepancy is found between the updated first state and the second state. The metadata is inserted using a metadata encoding technique. The metadata encoding technique is used to insert the metadata in the instruction stream, to enable it to take the form of an information operator. The information operator is a type of metadata. For example, if the SP, the FP, or the LR is different in the two states corresponding to a particular instruction, the information operator is inserted. In accordance with an embodiment of the present invention, the program is based on a Very Long Instruction Word (VLIW) instruction set architecture. The information operators can be inserted in place of the existing no-op instructions, and the back-trace analysis can be extended to use these information operators. The information operators are inserted in free slots of the VLIW program. A pending information operator is recorded in the VLIW program when a free slot is not available in the VLIW program. Further, an integrated scheduling algorithm is used to place information operators at the instructions of the program to minimize their impact on the size and performance of the program.

The entire process of comparing the two states and inserting the information operators is better understood with the help of the following explanation.

The compiler scans the code produced for each function of a program, which includes a plurality of functions and subroutines, and performs the static analysis of the program to compute the state of the SP, the FP, and the LR. In parallel, the compiler performs the dynamic analysis using the back-trace library to compute the state for the instructions of the function. When a discrepancy is found by the compiler at a particular instruction in the states of the SP, the FP and the LR, as determined by the static and dynamic analysis, it immediately inserts the information operator in the program.

Figure 4:
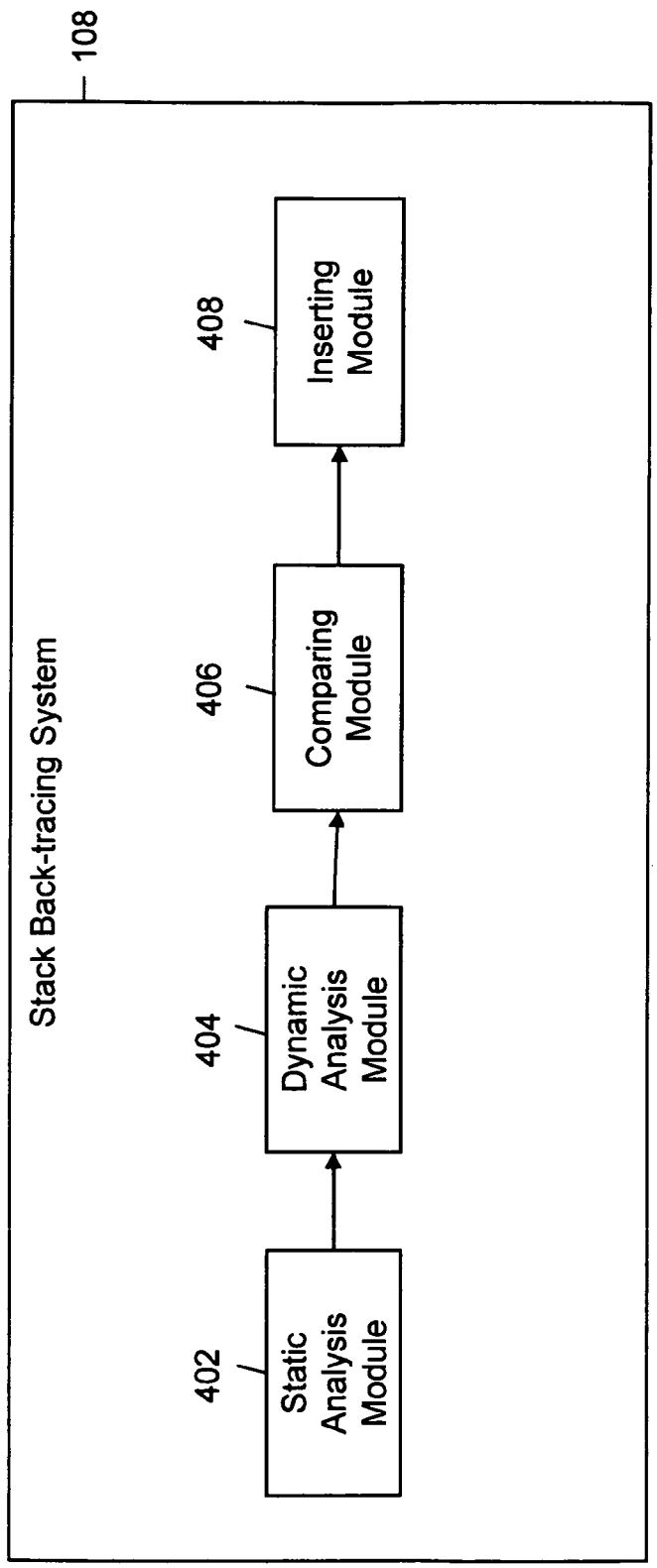
FIG. 4 illustrates a block diagram of a stack back-tracing system, in accordance with an embodiment of the invention.

FIG. 4 illustrates a block diagram of stack back-tracing system 108. Stack back-tracing system 108 includes a static analysis module 402, a dynamic analysis module 404, a comparing module 406, and an inserting module 408. Static analysis module 402 performs the static analysis of the program, i.e., the first state of the SP, the FP, and the LR is updated based on the static analysis of the instructions of the program, as explained at step 302 of FIG. 3.

Dynamic analysis module 404 performs the dynamic analysis of the program. It is used to determine the second state of the SP, the FP, and the LR, corresponding to the instructions of the program, as explained at step 304. Comparing module 406 is configured to compare the results of the static analysis and the dynamic analysis of the program, as explained at step 306. Inserting module 408 inserts the metadata into the program if a discrepancy is found between the results of the static and the dynamic analysis of the program. Inserting module 408 uses a metadata encoding technique to insert the metadata into the instruction stream to enable it to take the form of an information operator.

In accordance with an embodiment of the present invention, the program is based on a Very Long Instruction Word (VLIW) instruction set architecture. Inserting module 408 inserts the information operators in place of the existing no-op instructions, and the back-trace analysis can be extended to use these information operators. Inserting module 408 inserts the information operators into the program by using the free slots of the VLIW program. Further, Inserting module 408 records the pending information operator in the VLIW program when a free slot is not available in the VLIW program.

Figure 5:
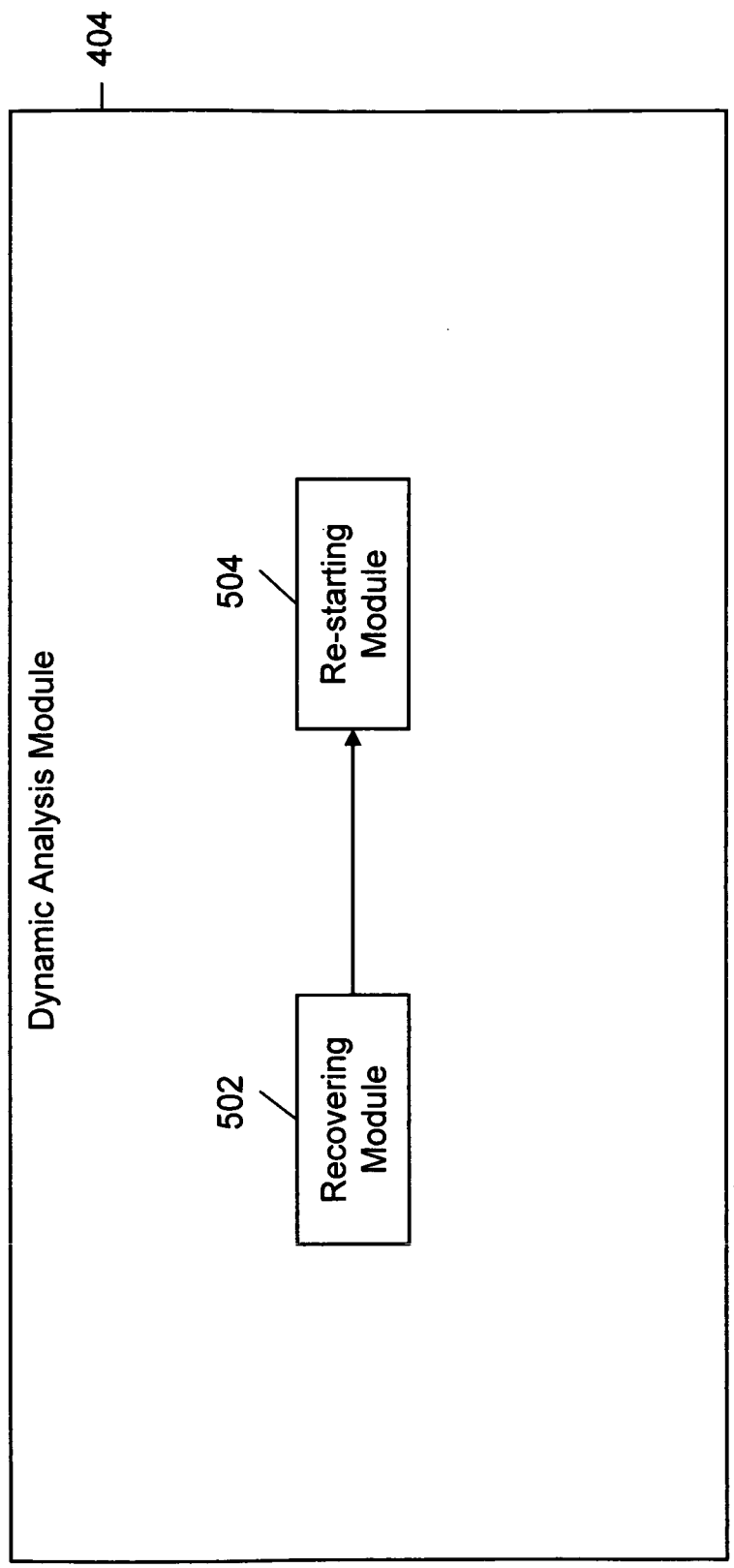
FIG. 5 illustrates a block diagram of a dynamic analysis module, in accordance with an embodiment of the invention.

FIG. 5 illustrates a block diagram of dynamic analysis module 404. Dynamic analysis module 404 includes recovering module 502 and re-starting module 504. In some cases, while executing a function, the operating system can raise an interrupt, which causes a special interrupt frame to be saved on the stack. In this case, the control passes to an interrupt handler, which can call other functions. In these cases, recovering module 502 back traces out of unusual transfers of control, such as interrupts and system calls by recovering the address of the instruction of the function encountering the interrupt. Thereafter, re-starting module 504 restarts the dynamic analysis from the point of the interrupt based on the recovered address.

Figure 6:
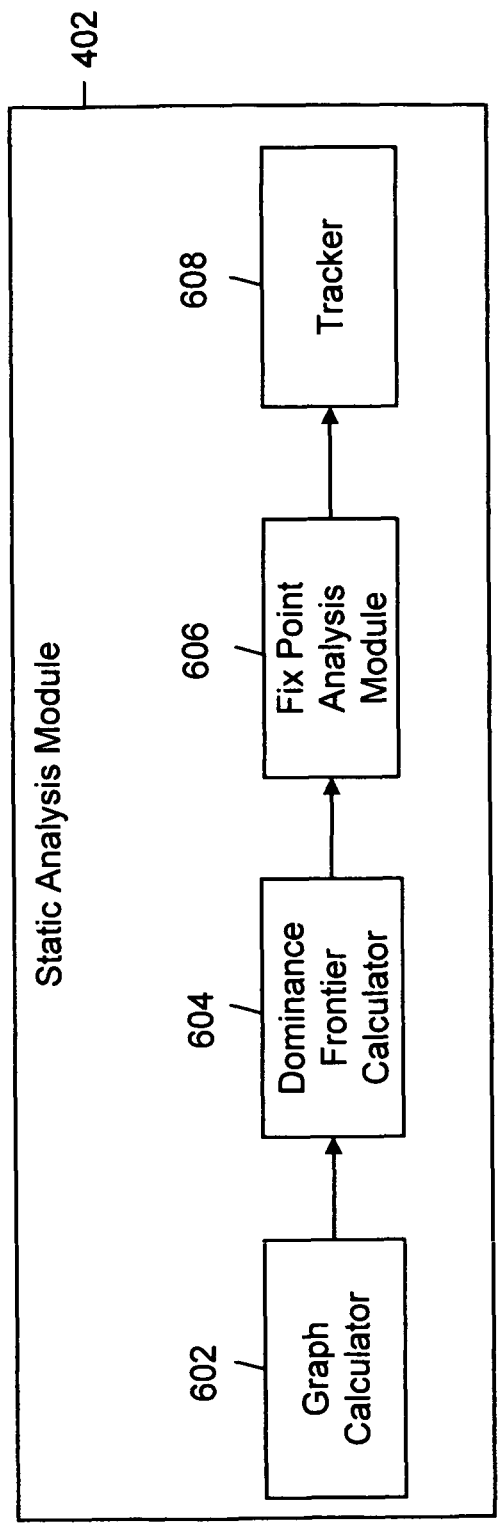
FIG. 6 illustrates a block diagram of a static analysis module, in accordance with an embodiment of the invention.

FIG. 6 illustrates a block diagram of static analysis module 402. Static analysis module 402 performs the static analysis of the program using the variant of the SSA technique. The variant of the SSA technique computes the potential states of the SP, the FP, and the LR at the one or more instructions of the program. Static analysis module 402 includes a graph calculator 602, a dominance frontier calculator 604, a fix point analysis module 606, and a tracker 608. Graph calculator 602 computes the control flow graph of the program. The control flow graph is a graphical representation of the program, composed of nodes and edges, depicting all paths that might be traversed during the execution of the program. Dominance frontier calculator 604 computes the dominator tree and iterative dominance frontiers of the control flow graph of the program. Fix point analysis module 606 iteratively computes the fix point for the set of input states of the nodes in the control flow graph based on the computed dominance frontiers. Furthermore, fix point analysis module 606 computes the potential states of the SP, the FP, and the LR at the one or more instructions of the program based on the iterative fix point analysis Tracker 608 tracks changes taking place in the potential states of the SP, the FP, and the LR at the one or more instructions of the program. In cases where the operating system raises an interrupt while executing a function, static analysis module 402 uses a dataflow algorithm to handle unusual transfers of control such as interrupts and system calls.

In accordance with an embodiment of the present invention, to optimize the placement of the information operator, the compiler can choose to delay the insertion of the information operator. The compiler can also insert multiple information operators or information operators of different forms to limit the runtime search. In an exemplary scenario, if the state at the instruction changes such that the information operator is no longer valid it still needs to be inserted. This may result in the insertion of a new instruction 'bundle'. In some cases this bundle is unreachable, i.e., it will never be executed. Therefore, the insertion of this bundle may increase the program size, but it does not affect the performance of the program.

In accordance with another embodiment of the present invention, the back-trace analysis is invoked late by the compiler. For example, the back-trace analysis can be invoked after the generation and optimization of the code. As mentioned earlier, the states of the SP, the FP, and the LR are preferably computed at each instruction of the program. The computation of these states is simple if the states of the SP, the FP, and the LR of the node are known. Given the state of these variables at the beginning of the node, computing the values of these variables at each instruction becomes possible by a simple symbolic interpretation of each instruction corresponding to the node. The process of determining the nodes and their states has been explained in the description of FIGS. 2A and 2B.

Those ordinarily skilled in the art will appreciate that the conventional SSA program representation, or its variant, can be used to combine the states of all the predecessor nodes. The conventional SSA or its variant is considered for the combining step, since the control flow graph of the program may have cycles and multiple passes in it which may be required to reach a fixed point on the graph. In this case, the SSA is effective and simple to use.

Various embodiments of the present invention relate to a method and system for performing a computer program analysis. Such a method enables the compiler to efficiently insert the information operator into the program without affecting its performance. Thereafter, the inserted information operators are utilized during the back-tracing analysis, which can even work in the presence of compiler optimization and other code transformations. Further, the present invention enables the compiler to place information operators efficiently to minimize their impact on the size and performance of the program. The present invention also enables a dynamic analysis to be performed simultaneously with the static analysis or compilation to insert the information operators. This results in an algorithm that is simple to execute at runtime. Furthermore, the present invention can work efficiently with a highly optimized code, an operating system kernel code, or with programming language features such as alloca.

The method and system, as described in the present invention or any of its components, may be embodied in the form of a computer system. Typical examples of a computer system include a general-purpose computer, a programmed microprocessor, a microcontroller, a peripheral integrated circuit element, and other devices or arrangements of devices that are capable of implementing the steps that constitute the method of the present invention.

The computer system typically comprises a computer, an input device, and a display unit. The computer further comprises a microprocessor, which is connected to a communication bus. The computer also includes a memory, which may be Random Access Memory (RAM) or Read Only Memory (ROM). The computer system further comprises a storage device, which may be a hard-disk drive or a removable storage drive, such as a floppy-disk drive and optical-disk drive. The storage device may also be other similar means for loading computer programs or other instructions into the computer system. The computer system also includes a communication unit, which enables the computer to connect to other databases and the Internet through an Input/Output (I/O) interface, allowing the transfer as well as reception of data from other databases. The communication unit may include a modem, an Ethernet card, or any other similar device, which enables the computer system to connect to databases and networks, such as LAN, MAN, WAN, and the Internet. The computer system facilitates inputs from a user through an input device, accessible to the system through an I/O interface.

The computer system executes a set of instructions that are stored in one or more storage elements to process input data. The storage elements may also hold data or other information as desired. The storage element may be in the form of an information source or a physical memory element present in the processing machine.

The programmable instructions may include various commands that instruct the processing machine to perform specific tasks such as the steps that constitute the method of the present invention. The method and systems described can also be implemented using only software programming or using only hardware or by a varying combination of the two techniques. The present invention is independent of the programming language used and the operating system in the computers. The instructions for the invention can be written in all programming languages including, but not limited to, C, C++, Visual C++, and Visual Basic. Further, the software may be in the form of a collection of separate programs, a program module with a large program or a portion of a program module. The software may also include modular programming in the form of object-oriented programming. The processing of input data by the processing machine may be in response to user commands, results of previous processing or a request made by another processing machine. The invention can also be implemented in all operating systems and platforms including, but not limited to, Unix, DOS, and Linux.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for performing a computer program analysis, the method comprising:
    (a) performing a static analysis of the computer program to compute a first set of states of a stack pointer, a frame pointer and a link register at one or more instructions of the computer program;

(b) performing a dynamic analysis of the computer program to compute a second set of states of the stack pointer, the frame pointer and the link register, wherein the dynamic analysis is modeled during a compile time;

(c) comparing the first set of states determined by the static analysis and the second set of states determined by the dynamic analysis; and (d) inserting metadata into the computer program when a discrepancy is found between the first set of states determined by the static analysis and the second set of states determined by the dynamic analysis.

2. The method according to claim 1, wherein the static analysis of the computer program is performed at compile time.

3. The method according to claim 1, wherein the computer program analysis is a stack back-trace analysis of the computer program.

4. The method according to claim 1, wherein inserting the metadata into the computer program comprises using a metadata encoding technique.

5. The method according to claim 1, wherein the computer program is based on a Very Long Instruction Word (VL1W) program.

6. The method according to claim 5, wherein inserting the metadata into the computer program comprises:
(a) using free slots of the VLIW program to insert one or more information operators into the VLIW program; and
(b) recording a pending information operator in the VLIW program when a free slot is not available in the VLIW program.

7. The method according to claim 1, wherein performing the static analysis of the computer program comprises using a dataflow algorithm for handling unusual transfers of control.

8. The method according to claim 1, wherein performing the dynamic analysis of the computer program comprises:
(a) recovering an address of one or more instructions of the computer program encountering an interrupt; and
(b) re-starting the dynamic analysis from the one or more instructions based on the recovered address.

9. The method according to claim 1, wherein performing the static analysis of the computer program further comprises using a variant of a single static assignment technique to compute the first set of states of the stack pointer, the frame pointer and the link register at the one or more instructions of the computer program.

10. The method according to claim 9, wherein using the variant of the single static assignment technique comprises:
(a) computing a control flow graph for the computer program, wherein the control flow graph comprises one or more nodes corresponding to the one or more instructions;
(b) computing iterative dominance frontiers of the one or more nodes of the control flow graph; and
(c) computing the first set of states of the stack pointer, the frame pointer and the link register at the one or more instructions of the computer program based on an iterative fix point analysis.

11. The method according to claim 10 further comprising tracking changes to the first set of states of the stack pointer, the frame pointer and the link register at the one or more instructions of the computer program.

12. A processor comprising:
a system for performing a computer program analysis; wherein the system comprises:
(a) a static analysis module for performing a static analysis of the computer program, wherein the static analysis module comprises a graph calculator for computing a control flow graph for the computer program, wherein the control flow graph comprises one or more nodes corresponding to one or more instructions;
(b) a dynamic analysis module for performing a dynamic analysis of the computer program, wherein the dynamic analysis is modeled during a compile time;
(c) a comparing module for comparing one or more results of the static analysis and the dynamic analysis;
(d) an inserting module for inserting metadata into the computer program when a discrepancy is found between the one or more results of the static analysis and the dynamic analysis;
(e) a dominance frontier calculator for computing iterative dominance frontiers of the one or more nodes of the control flow graph; and
(f) a fix point analysis module for computing the one or more potential states of the stack pointer, the frame pointer and the link register at the one or more instructions of the computer program.

13. The system according to claim 12, wherein the static analysis module is adapted to perform at compile time.

14. The system according to claim 12, wherein the computer program analysis is a stack back-trace analysis of the computer program.

15. The system according to claim 12, wherein the inserting module uses a metadata encoding technique to insert the metadata in the computer program.

16. The system according to claim 12, wherein the computer program is based on a Very Long Instruction Word (VL1W) program.

17. The system according to claim 16, wherein the inserting module inserts the metadata into the computer program by:
(a) using free slots of the VLIW program to insert one or more information operators into the VLIW program; and
(b) recording a pending information operator in the VLIW program when a free slot is not available in the VLIW program.

18. The system according to claim 12, wherein the static analysis module uses a dataflow algorithm for handling unusual transfers of control.

19. The system according to claim 12, wherein the dynamic analysis module comprises:
(a) a recovering module for recovering an address of one or more instructions of the computer program encountering an interrupt; and
(b) a re-starting module for re-starting the dynamic analysis from the one or more instructions based on the recovered address.

20. The system according to claim 12, wherein the static analysis module is adapted to use a variant of single static assignment technique to compute one or more potential states of a stack pointer, a frame pointer and a link register at one or more instructions of the computer program.

21. The system according to claim 20 further comprising a tracker configured to track changes to the one or more potential states of the stack pointer, the frame pointer and the link register at the one or more instructions of the computer program.

22. A computer program product for use with a computer, the computer program product comprising instructions stored in a non-transitory computer usable medium having a computer readable program code embodied therein for performing a computer program analysis, the computer readable program code comprising:
(a) program instructions for performing a static analysis of the computer program to compute a first set of states of a stack pointer, a frame pointer and a link register at one or more instructions of the computer program;

(b) program instructions for performing a dynamic analysis of the computer program to compute a second set of states of the stack pointer, the frame pointer and the link register, wherein the dynamic analysis is modeled during a compile time;

(c) program instructions for comparing the first set of states determined by the static analysis and the second set of states determined by the dynamic analysis; and (d) program instructions for inserting metadata into the computer program when a discrepancy is found between the first set of states determined by the static analysis and the second set of states determined by the dynamic analysis.

* * * * *